United States Patent
Maeda et al.

(10) Patent No.: US 7,707,392 B2
(45) Date of Patent: Apr. 27, 2010

(54) ACCESSING DATA IN INACCESSIBLE MEMORY WHILE EMULATING MEMORY ACCESS INSTRUCTION BY EXECUTING TRANSLATED INSTRUCTIONS INCLUDING CALL TO TRANSFER DATA TO ACCESSIBLE MEMORY

(75) Inventors: Seiji Maeda, Kawasaki (JP); Hidenori Matsuzaki, Kawasaki (JP); Yusuke Shirota, Fuchu (JP); Kazuya Kitsunai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 12/047,835

(22) Filed: Mar. 13, 2008

(65) Prior Publication Data

US 2008/0301415 A1 Dec. 4, 2008

(30) Foreign Application Priority Data

May 31, 2007 (JP) ............................. P2007-145706

(51) Int. Cl.
*G06F 9/312* (2006.01)
(52) U.S. Cl. ...................... 712/225; 717/138
(58) Field of Classification Search ................... None
See application file for complete search history.

(56) References Cited

U.S. PATENT DOCUMENTS

| 5,301,287 | A * | 4/1994 | Herrell et al. ................ 711/202 |
| 6,820,254 | B2 * | 11/2004 | Smith et al. ................. 717/151 |
| 6,941,545 | B1 | 9/2005 | Reese et al. |
| 2006/0253654 | A1 * | 11/2006 | Adachi ........................ 711/123 |

FOREIGN PATENT DOCUMENTS

| EP | 0 668 560 A2 | 1/1995 |
| JP | 2002-536712 | 10/2002 |
| WO | WO 00/45257 | 8/2000 |

* cited by examiner

*Primary Examiner*—Kenneth S Kim
(74) *Attorney, Agent, or Firm*—Oblon, Spivak, McClelland, Maier & Neustadt, L.L.P.

(57) ABSTRACT

An information processing system includes a first processor that accesses a first memory, a second processor that accesses a second memory, and a data transfer unit for executing data transfer between the first memory and the second memory. The first processor executes functions of translating an instruction out of instructions included in the program except a memory access instruction into an instruction for the second processor and translating the memory access instruction into an instruction sequence containing a call instruction of the program to transfer the access data on the first memory to the second memory via a data transfer unit.

6 Claims, 5 Drawing Sheets

FIG. 4

| INSTRUCTION OF FIRST INSTRUCTION SET | INSTRUCTION OF SECOND INSTRUCTION SET |
|---|---|
| add | a |
| subf | sf |
| ⋮ | ⋮ |
| b | br |

FIG. 5

| INSTRUCTION OF FIRST INSTRUCTION SET | LIBRARY ADDRESS |
|---|---|
| load | 0 x 31000 |
| store | 0 x 32000 |
| | |

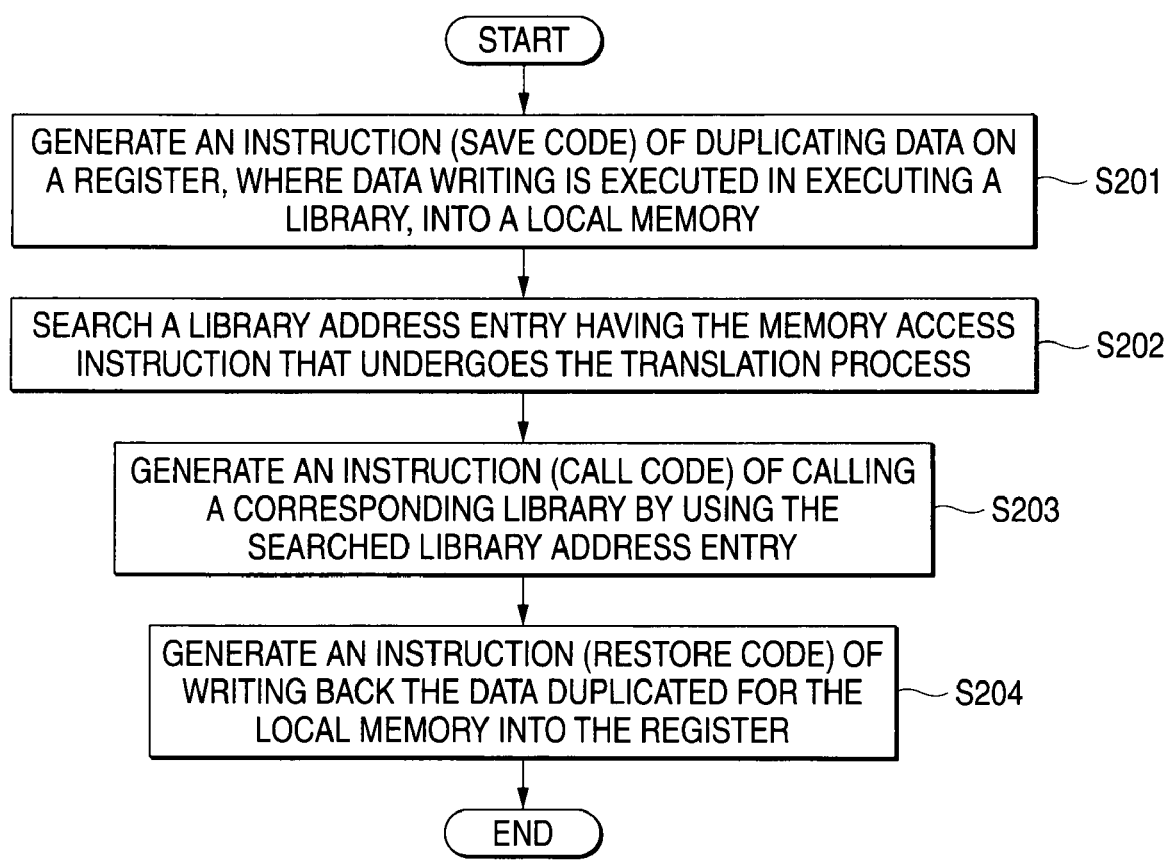

ACCESSING DATA IN INACCESSIBLE MEMORY WHILE EMULATING MEMORY ACCESS INSTRUCTION BY EXECUTING TRANSLATED INSTRUCTIONS INCLUDING CALL TO TRANSFER DATA TO ACCESSIBLE MEMORY

RELATED APPLICATION(S)

The present disclosure relates to the subject matters contained in Japanese Patent Application No. 2007-145706 filed on May 31, 2007which is incorporated herein by reference in its entirety.

FIELD

The present invention relates to an information processing system.

BACKGROUND

In conventional information processing systems, there is proposed to employ an asymmetric multiprocessor configuration, in which equipping the system with both a general-purpose processor suitable for processing various application programs and a specialized processor suitable for the particular application programs, such as programs dealing with multimedia data.

In the asymmetric multiprocessor configuration, instructions suitable for respective application programs are provided to the general-purpose processor and the specialized processor to make a processing performance and an implementation efficient. For this reason, normally, sets of executable instructions for each of the processors are designed to be different. In case both the general-purpose processor and the specialized processor having different instruction sets execute the program having the same function, the program corresponding to the instruction set for the general-purpose processor and the program corresponding to the instruction set for the specialized processor are needed.

However, when such a configuration is employed, in which programs are prepared for every processors different with one another in instruction sets, there occurs a problem that a storage area of the memory used to store the programs will be increased.

Therefore, a technology for a binary translator that translates a program designed based on an instruction set for the general-purpose processor into a program having an instruction set for the specialized processor. An example of such technology is disclosed in an international patent application published under the publication number: WO00/45257.

As described above, in the document WO00/45257, the technology to translate the program designed based on the instruction set for the general-purpose processor into the program having the instruction set for the specialized processor is disclosed.

However, for example, when changing the processor that executes the program dynamically from the general-purpose processor to the specialized processor in accordance with current processing loads of respective processors, the specialized processor that succeeds to the execution of the program must access the data used in executing the program, which is stored in a main memory or a local memory that are provided for the general-purpose processor that executed the program before the succession.

On the other hand, some specialized processors are configured such that it cannot access an external memory such as the local memory of other processor. In such case, even though the program designed based on the instruction set for the general-purpose processor is translated into the program corresponding to the instruction set for the specialized processor, the specialized processor cannot access the data used in executing the program. As a result, such a problem existed that the translated program cannot be correctly executed by the specialized processor.

SUMMARY

According to a first aspect of the invention, there is provided an information processing system including: a first processor that executes instructions belonging to a first instruction set; a second processor that executes instructions belonging to a second instruction set; a first memory that stores a translation target program that is designed based on the first instruction set, the first memory being unaccessible by the second processor; a second memory that is accessible by the second processor; and a data transfer unit that transfers data between the first memory and the second memory, wherein the first processor operates to: read the translation target program from the first memory; determine each of instructions included in the translation target program is whether a memory access instruction; translate the instructions that are determined to be not the memory access instruction into instructions belonging to the second instruction set; and translate the instructions that are determined to be the memory access instruction into instruction sequence including a call instruction calling a data transfer library that is stored in the second memory, and wherein the second processor operates to: execute the translated instructions that belong to the second instruction set; and controls the data transfer unit to transfer the data between the first memory and the second memory in accordance with the instruction sequence.

According to a second aspect of the invention, there is provided an information processing system including: a first processor that executes instructions belonging to a first instruction set; a second processor that executes instructions belonging to a second instruction set; a first memory that stores a translation target program that is designed based on the first instruction set, the first memory being unaccessible by the second processor; a second memory that is accessible by the second processor; and a data transfer unit that transfers data between the first memory and the second memory, wherein the second processor operates to: control the data transfer unit to transfer the translation target program from the first memory to the second memory; read the translation target program from the second memory; determine each of instructions included in the translation target program is whether a memory access instruction; translate the instructions that are determined to be not the memory access instruction into instructions belonging to the second instruction set; translate the instructions that are determined to be the memory access instruction into instruction sequence including a call instruction calling a data transfer library that is stored in the second memory; execute the translated instructions that belong to the second instruction set; and control the data transfer unit to transfer the data between the first memory and the second memory in accordance with the instruction sequence.

According to a third aspect of the invention, there is provided an information processing system including: a first processor that executes instructions belonging to a first instruction set; a second processor that executes instructions belonging to a second instruction set; a first memory that stores a translation target program that is designed based on the first instruction set, the first memory being unaccessible by the second processor; a second memory that is accessible by the second processor; a data transfer unit that transfers data between the first memory and the second memory; and a performance monitor that monitors processing loads of the first processor and the second processor and controls the first processor and the second processor to perform one of process [A] and [B] in accordance with the monitored processing loads, wherein as the process [A], the first processor operates to: read the translation target program from the first memory; determine each of instructions included in the translation target program is whether a memory access instruction; translate the instructions that are determined to be not the memory access instruction into instructions belonging to the second instruction set; and translate the instructions that are determined to be the memory access instruction into instruction sequence including a call instruction calling a data transfer library that is stored in the second memory, and the second processor operates to: execute the translated instructions that belong to the second instruction set; and control the data transfer unit to transfer the data between the first memory and the second memory in accordance with the instruction sequence, and wherein as the process [B], the second processor operates to: control the data transfer unit to transfer the translation target program from the first memory to the second memory; read the translation target program from the second memory; determine each of instructions included in the translation target program is whether a memory access instruction; translate the instructions that are determined to be not the memory access instruction into instructions belonging to the second instruction set; translate the instructions that are determined to be the memory access instruction into instruction sequence including a call instruction calling a data transfer library that is stored in the second memory; execute the translated instructions that belong to the second instruction set; and controls the data transfer unit to transfer the data between the first memory and the second memory in accordance with the instruction sequence.

According to a fourth aspect of the invention, there is provided a method for an information processing system including: a first processor that executes instructions belonging to a first instruction set; a second processor that executes instructions belonging to a second instruction set; a first memory that is unaccessible by the second processor; a second memory that is accessible by the second processor; and a data transfer unit that transfers data between the first memory and the second memory, wherein the method includes: controlling the first processor to: read the translation target program from the first memory; determine each of instructions included in a translation target program is whether a memory access instruction, the translation target program being stored in the first memory and designed based on the first instruction set; translate the instructions that are determined to be not the memory access instruction into instructions belonging to the second instruction set; and translate the instructions that are determined to be the memory access instruction into instruction sequence including a call instruction calling a data transfer library that is stored in the second memory; and controlling the second processor to: execute the translated instructions that belong to the second instruction set; and controls the data transfer unit to transfer the data between the first memory and the second memory in accordance with the instruction sequence.

According to a fifth aspect of the invention, there is provided a computer-readable recording medium that stores a program for causing an information processing system to operate in accordance with a procedure, wherein the information processing system includes: a first processor that executes instructions belonging to a first instruction set; a second processor that executes instructions belonging to a second instruction set; a first memory that is unaccessible by the second processor; a second memory that is accessible by the second processor; and a data transfer unit that transfers data between the first memory and the second memory, wherein the procedure includes: controlling the first processor to: read the translation target program from the first memory; determine each of instructions included in a translation target program is whether a memory access instruction, the translation target program being stored in the first memory and designed based on the first instruction set; translate the instructions that are determined to be not the memory access instruction into instructions belonging to the second instruction set; and translate the instructions that are determined to be the memory access instruction into instruction sequence including a call instruction calling a data transfer library that is stored in the second memory; and controlling the second processor to: execute the translated instructions that belong to the second instruction set; and controls the data transfer unit to transfer the data between the first memory and the second memory in accordance with the instruction sequence.

BRIEF DESCRIPTION OF THE DRAWINGS

In the accompanying drawings:

FIG. 4 is a view showing an example of an instruction translation table;

FIG. 5 is a view showing an example of a library address table; and

FIG. 6 is a flowchart showing an operation of the information processing system according to the embodiment.

DETAILED DESCRIPTION OF THE EMBODIMENTS

An embodiment of the present invention will be explained with reference to the accompanying drawings.

Figure 1:
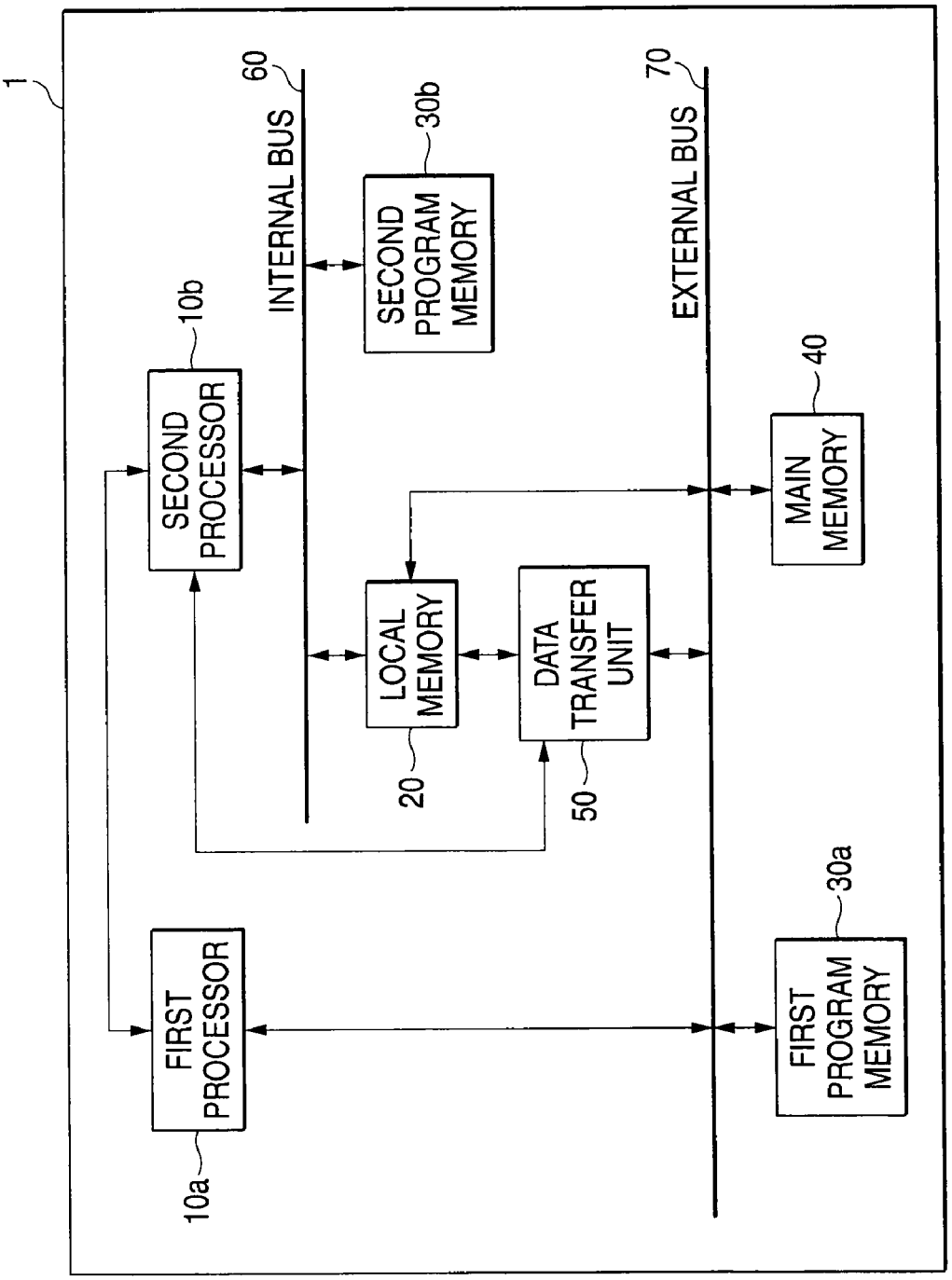
FIG. 1 is a block diagram showing a configuration of an information processing system according to an embodiment of the present invention.

FIG. 1 is a block diagram showing an information processing system 1 according to the embodiment. The information processing system 1 includes a first processor 10*a*, a second processor 10*b*, a local memory 20, a first program memory 30*a*, a second program memory 30*b*, a main memory 40, a data transfer unit 50, an internal bus 60, and an external bus 70.

The first processor 10*a* is connected to the first program memory 30*a* and the main memory 40 via the external bus 70. The second processor 10*b* is connected to the local memory 20 and the second program memory 30*b* via the internal bus 60. The first processor 10*a* and the second processor 10*b* are connected to perform synchronization with operating process. The second processor 10*b* is connected to the data transfer unit 50.

The first processor 10*a* accesses the first program memory 30*a* and the main memory 40, and executes the operating process associated with the execution of the programs stored in the first program memory 30*a* and the main memory 40. A first instruction set for the first processor 10a is different from a second instruction set for the second processor 10b.

The first program memory 30a is configured by a read-only memory (ROM), for example, and stores the program that is executed by the first processor 10a. The main memory 40 is configured by a random access memory (RAM), for example, and stores the program executed by the first processor 10a and the data used when the first processor 10a executes the program.

The second processor 10b accesses the local memory 20 and the second program memory 30b, and executes the operating process associated with the execution of the programs stored in the local memory 20 and the second program memory 30b. The second processor 10b controls the data transfer unit 50. The data transfer unit 50 controlled by the second processor 10b executes the data transfer between the local memory 20 and the main memory 40.

The local memory 20 is configured by RAM and stores the program executed by the second processor 10b and the data used when the second processor 10b executes the program. Also, the local memory 20 caches (temporarily stores) the data stored in the main memory 40. The second program memory 30b is composed of the RAM, for example, and stores the program that is executed by the second processor 10b.

The data transfer unit 50 is controlled by the second processor 10b, and transfers the data from the main memory 40 to the local memory 20 and vice versa. The data transfer unit 50 is configured by a direct memory access controller (DMA controller), for example.

Figure 2:
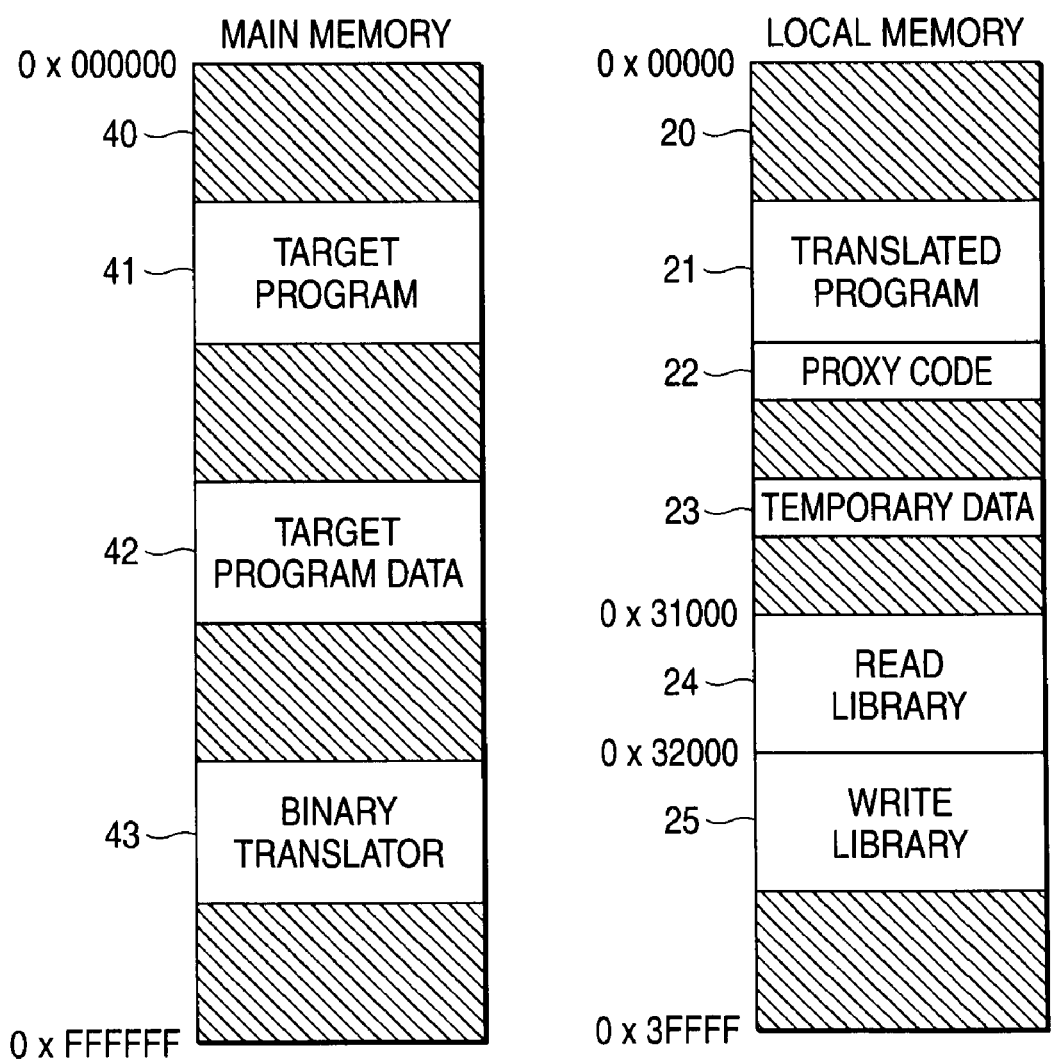
FIG. 2 is a view showing an example of stored data in a main memory and a local memory according to the embodiment.

FIG. 2 shows an example of the data and the program stored contents of the main memory 40 and the local memory 20 respectively.

In an example shown in FIG. 2, the main memory 40 stores a target program 41, a target program data 42, and a binary translator 43. The local memory 20 stores a translated program 21, a proxy code 22, a temporary data 23, a read library 24, and a write library 25.

The target program 41 is designed based on the first instruction set for the first processor 10a, and is a program that is executable by the first processor 10a. In other words, the target program 41 is configured by instructions belonging to the first instruction set. It is desirable that the target program 41 can also be executed by the second processor 10b to attain a load sharing between the first processor 10a and the second processor 10b, and the like. However, the target program 41 is not designed based on the second instruction set for the second processor 10b. Therefore, the second processor 10b cannot natively execute the target program 41.

The target program data 42 is the data used when the first processor 10a executes the target program 41.

The binary translator 43 is designed based on the first instruction set for the first processor 10a, and is a program that is executable by the first processor 10a. The binary translator 43 has a function to translate the program based on the first instruction set for the first processor 10a into the program based on the second instruction set for the second processor 10b. Here, details of the binary translator 43 will be described later.

The translated program 21 is the program that causes the processor to execute the same function as the target program 41. The translated program 21 is based on the second instruction set for the second processor 10b, and is executable by the second processor 10b. The translated program 21 is obtained when the first processor 10a translates the target program 41 into the program corresponding to the second instruction set for the second processor 10b in accordance with the binary translator 43.

The proxy code 22 is a micro program generated when the first processor 10a translates the target program 41 into the translated program 21 in accordance with the binary translator 43. The proxy code 22 allows the second processor 10b to call the read library 24 and the write library 25, which will be described in detail later, to thereby execute a function of accessing the data (e.g., the target program data 42) stored in the main memory 40.

In an example shown in FIG. 2, the translated program 21 and the proxy code 22 are stored separately in the local memory 20. However, the proxy code 22 may be incorporated into the translated program 21 when the target program 41 is translated into the translated program 21 by the binary translator 43.

The read library 24 and the write library 25 are program libraries that are executable by the second processor 10b. In these libraries, a plurality of programs to be used when the second processor 10b controls the data transfer unit 50 are collected. The read library 24 and the write library 25 serves as a data transfer library including a call instruction to be included in a translated instruction sequence, into which a part of the translate target program is translated.

The read library 24 causes the second processor 10b to control the data transfer unit 50, and executes a function of transferring the data stored in the main memory 40 into the local memory 20. The write library 25 causes the second processor 10b to control the data transfer unit 50, and executes a function of transferring the data stored in the local memory 20 into the main memory 40.

The read library 24 and the write library 25 cause the second processor 10b to execute a function of temporarily storing (caching) a part of the data being transferred from the main memory 40 to the local memory 20 as the temporary data 23. A start address of the read library 24 is "0x31000", and a start address of the write library 25 is "0x32000".

Figure 3:
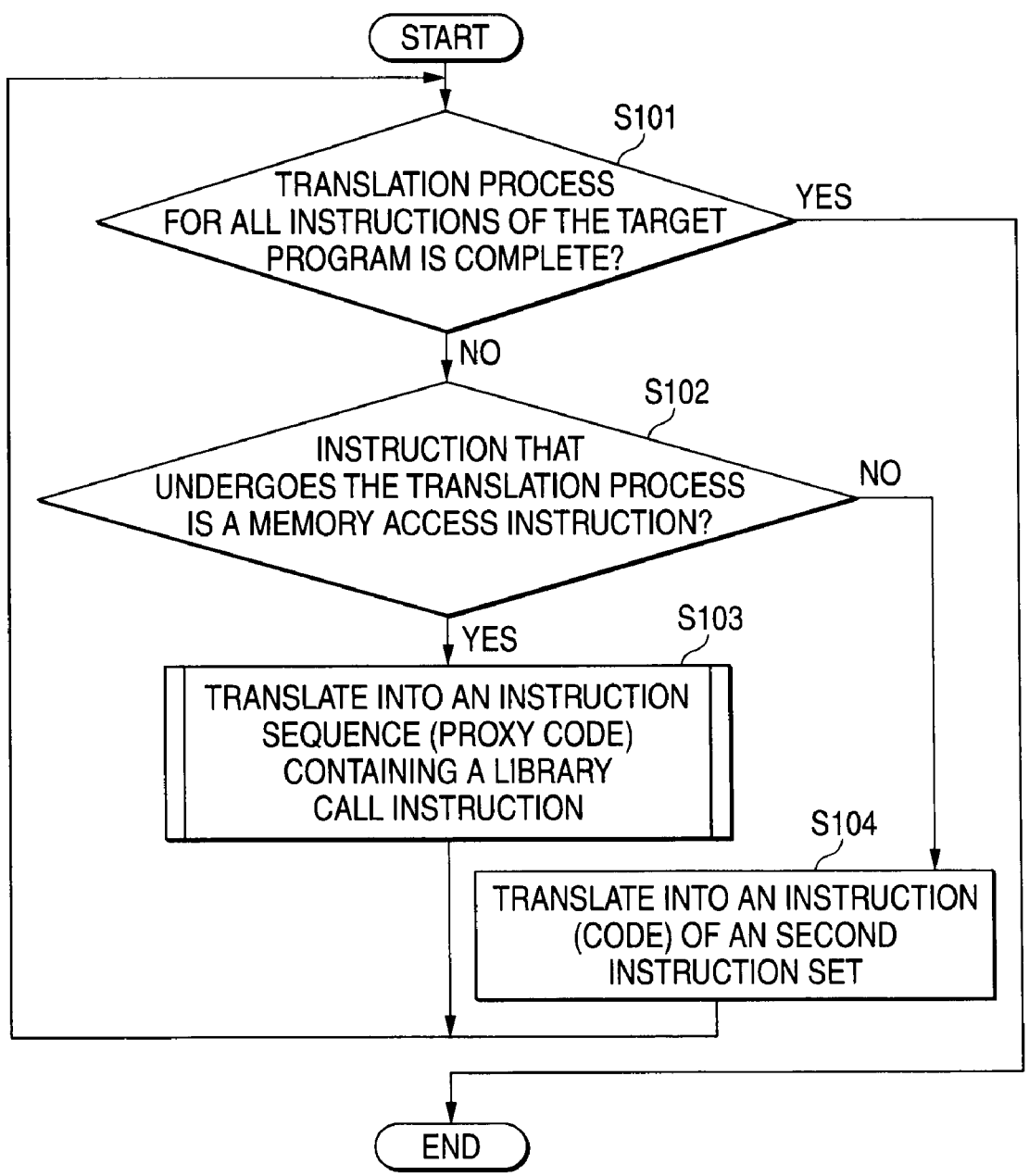
FIG. 3 is a flowchart showing an operation of the information processing system according to the embodiment.

FIG. 3 is a flowchart showing an operation of the first processor 10a when the first processor 10a translates the target program 41 that is designed based on the first instruction set of the first processor 10a into the translated program 21 based on the second instruction set of the second processor 10b in accordance with the binary translator 43.

First, the first processor 10a executes the binary translator 43 (program) that is designed based on the first instruction set of the first processor 10a. The first processor 10a reads the target program 41 from the main memory 40 in accordance with the binary translator 43.

Then, the first processor 10a determines whether or not a translation process of the instruction, which can be executed by the first processor 10a, out of all instructions included in the target program 41 into the instruction that is executable by the second processor 10b is completed in accordance with the binary translator 43 (step S101).

When determined that the translation process of all instructions included in the target program 41 is completed (Yes in step S101), the first processor 10a ends the execution of the binary translator 43.

When determined that the translation process of all instructions included in the target program 41 is not completed (No in step S101), the first processor 10a sequentially executes the translation process of the untranslated instructions (step S102 to step S104) in accordance with the binary translator 43.

The translation process that the first processor 10a executes will be explained hereunder. First, the first processor 10a determines whether or not the instruction as the translation process target out of the instructions included in the target program 41 is the memory access instruction (step S102). In this case, the memory access instruction is the memory load instruction, the memory store instruction, or the like, for example, and is accompanied with a data reading process or a data writing process from or into the main memory 40 when the concerned instruction is executed by the first processor 10a.

When determined that the instruction as the translation process target is not the memory access instruction (No in step S102), the first processor 10a translates the instruction of the first instruction set as the translation process target into the instruction of the second instruction set (the code for the second processor 10b) in accordance with an instruction translation table (FIG. 4; step S104).

FIG. 4 shows the instruction translation table used when the first processor 10a translates the instruction of the first instruction set into the instruction of the second instruction set in accordance with the binary translator 43 (step S104 in FIG. 3). The instruction translation table holds a plurality of translation entries in which the instructions of the first instruction set are correlated with one instruction or plural instructions of the second instruction set respectively. The instruction translation table may be installed into the binary translator 43. Alternately, the instruction translation table may be stored in the first program memory 30a or the main memory 40 where the first processor 10a can access.

In an example shown in FIG. 4, the instruction translation table has a translation entry as a set of an addition instruction "add" of the first instruction set and an addition instruction "a" of the second instruction set, a translation entry as a set of a subtraction instruction "subf" of the first instruction set and a subtraction instruction "sf" of the second instruction set, and a translation entry as a set of a branch instruction "br" of the first instruction set and a branch instruction "b" of the second instruction set.

For example, in step S104 in FIG. 3, when the instruction as the translation process target is the addition instruction "add", the first processor 10a searches the translation entry having the addition instruction "add" of the first instruction set from the instruction translation table, and translates this addition instruction "add" into the addition instruction "a" of the second instruction set.

Similarly, when the instruction as the translation process target is the subtraction instruction "subf", the first processor 10a translates this subtraction instruction "subf" into the subtraction instruction "sf" of the second instruction set. Also, when the instruction as the translation process target is the branch instruction "b", the first processor 10a translates this branch instruction "b" into the branch instruction "br" of the second instruction set.

When determined that the instruction as the translation process target is the memory access instruction (Yes in step S102), the first processor 10a not only causes the memory access instruction of the first instruction set as the translation process target to correspond to the second instruction set that the second processor 10b can execute, but also translates this instruction into the instruction sequence that enables that the second processor 10b to access the memory (the proxy code 22 for the second processor 10b).

The reason why the first processor 10a executes the above processes will be explained hereunder.

The first processor 10a accesses the target program data 42 stored in the main memory 40, and the like in executing the target program 41. However, the second processor 10b is not connected to the main memory 40, and cannot access the main memory 40.

For this reason, even though the first processor 10a translates the memory access instruction (e.g., load instruction) of the first instruction set into the corresponding memory access instruction of the second instruction set, the second processor 10b cannot execute the above instruction when the data to be accessed is stored in the main memory 40.

Therefore, in translating the memory access instruction into the instruction that the second processor 10b can execute, the first processor 10a not simply causes this instruction to translate into the second instruction set but also must translate the instruction into the instruction sequence that enables the second processor 10b to execute the memory access generated when the instruction as the translation process target is executed by the second processor 10b.

When the second processor 10b accesses the data stored in the main memory 40, such second processor 10b controls the data transfer unit 50 to transfer the data stored in the main memory 40 to the local memory 20, and then accesses the data transferred to the local memory 20.

For this purpose, in translating the memory access instruction into the instruction that the second processor 10b can execute, the first processor 10a translates this instruction into the instruction sequence containing the instruction to call the read library 24 or the write library 25 that is used for controlling the data transfer unit 50 to execute the data transmission between the main memory 40 and the local memory 20 (the proxy code 22 for the second processor 10b). A method applied when the first processor 10a translates the memory access instruction into the proxy code 22 will be described later (steps S201 to S204 in FIG. 6).

Then, the first processor 10a translate the instruction as the translation process target into either the code for the second processor 10b (step S104) or the proxy code 22 for the second processor 10b (step S103), in response to whether or not the instruction as the translation process target is the memory access instruction. Then, the first processor 10a executes the process in step S101 once again.

That is, the first processor 10a determines whether or not the process of translating the instruction that the first processor 10a can execute into the instruction that the second processor 10b can execute has been applied to all instructions included in the target program 41.

When determined that the translation process of all instructions is completed (Yes in step S101), the first processor 10a ends the execution of the binary translator 43. Here, since the process of translating all instructions included in the target program 41 into the code for the second processor 10b or the proxy code 22 for the second processor 10b is completed, the first processor 10a can construct the translated program 21 from the code for the second processor 10b or the proxy code 22 for the second processor 10b.

When determined that the translation process of all instructions is not completed (No in step S101), the first processor 10a executes the translating process of the untranslated instructions (steps S102 to S104) repeatedly.

As described above, the first processor 10a translates the target program 41 for the first processor 10a into the translated program 21 for the second processor 10b in accordance with the binary translator 43.

FIG. 5 shows a library address table used when the first processor 10a translates the memory access instruction as the translation process target into the proxy code 22 for the program B in accordance with the binary translator 43 (step S103 in FIG. 3).

The library address table holds a plurality of library address entries in which the memory access instructions of the first instruction set are correlated with head addresses of the corresponding libraries respectively. Here, the library address table may be installed into the binary translator 43. Otherwise, the library address table may be stored in the first program memory 30a or the main memory 40 that the first processor 10a can access.

In the example shown in FIG. 5, the library address table has a library address entry that is a set of a memory load instruction "load" of the first instruction set and a head address "0x31000" of the read library 24 and a library address entry that is a set of a memory store instruction "store" of the first instruction set and a head address "0x32000" of the write library 25.

FIG. 6 is a flowchart showing an operation of the first processor 10a when the first processor 10a translates the memory access instruction as the translation process target into the proxy code 22 for the second processor 10b in accordance with the binary translator 43 (step S103 in FIG. 4).

First, the first processor 10a generates a save code for duplicating the data that has already been stored on the registers, which is used when the read library 24 or the write library 25 is executed by the second processor 10b, into the local memory 20 (step S201).

The save code is provided to prevent such a situation that the data stored in the registers of the second processor 10b (e.g., the course of the process of the translated program 21) is lost because the read library 24 or the write library 25 is called when the translated program 21 is executed by the second processor 10b.

Then, the first processor 10a accesses the library address table (FIG. 5), and searches the library address entry having the memory access instruction that is the instruction of the first instruction set as the translation process target (step S202).

Then, the first processor 10a generates a call instruction of the corresponding library (a call code for the second processor 10b) by using the library address entry searched from the library address table (step S203).

For example, in step S103 in FIG. 3, when the memory access instruction as the translation process target is the memory load instruction "load", the first processor 10a searches the library address entry having the memory load instruction "load" of the first instruction set from the library address table (step S202), and acquires the head address "0x31000" of the read library 24.

The read library 24 is the program that causes the second processor 10b to control the data transfer unit 50 and implements a function of transferring the data on the main memory 40 to the local memory 20. The first processor 10a generates the instruction that calls the read library 24 (the call code for the second processor 10b) by using the head address "0x31000" of the read library 24. This call code allows the second processor 10b to call the read library 24, to thereby implement a function of transferring the data on the main memory 40, which is accessed by the memory load instruction "load", to the local memory 20.

The call code also allows the second processor 10b to call the read library 24, to thereby implement a function of loading the data being transferred from the main memory 40 to the local memory 20 from the local memory 20.

Then, the first processor 10a generates the instruction (a restore code for the second processor 10b) of writing back the data, which is duplicated from the registers to the local memory 20 when the save code generated in step S201 is executed, into the registers in which the data is stored just before the data is duplicated (step S204).

As described above, the first processor 10a generates the save code, the call code, and the restore code for the second processor 10b from the memory access instruction as the translation process target in accordance with the binary translator 43, and generates the proxy code 22 by combining sequentially these codes. In this manner, the first processor 10a translates the memory access instruction as the translation process target into the proxy code 22 for the second processor 10b.

In this manner, according to the information processing system 1 of the embodiment, even though the second processor 10b cannot access the main memory 40, the target program 41 corresponding to the first instruction set of the first processor 10a can be translated to the program that is executed correctly by the second processor 10b when this target program 41 is translated into the translated program 21 corresponding to the different second instruction set of the second processor 10b.

In the above, the binary translator 43 is assumed as the program designed based on the first instruction set of the first processor 10a and stored in the main memory 40. However, the binary translator 43 may be stored in the local memory 20 and may be designed based on the second instruction set of the second processor 10b.

In that case, the second processor 10b controls the data transfer unit 50 to transfer the target program 41 stored in the main memory 40 to the local memory 20. Then, the second processor 10b translates the target program 41 transferred to the local memory 20 and based on the first instruction set of the first processor 10a into the translated program 21 based on the second instruction set of the second processor 10b in accordance with the binary translator 43 for the second processor 10b.

According to such procedures, when it is determined that a processing load on the first processor 10a is high, the second processor 10b performs the translation process from the target program 41 to the translated program 21 and the execution process of the translated program 21. Thus, the processing load on the first processor 10a can be reduced.

Also, such a configuration may be employed that the binary translator 43 based on the first instruction set of the first processor 10a is stored in the main memory 40 and the binary translator based on the second instruction set of the second processor 10b is stored in the local memory 20.

According to such procedure, it is determined which one of the first processor 10a and the second processor 10b should execute the translation process from the target program 41 to the translated program 21, in response to the processing loads on the first processor 10a and the second processor 10b.

The information processing apparatus 1 may be implemented with a performance monitor that monitors processing loads of the first processor 10a and the second processor 10b. The performance monitor determines which of the first processor 10a and the second processor 10b to perform the translation process in accordance with the monitored processing loads and controls the first processor 10a and the second processor 10b accordingly. The performance monitor may be employed by an additional processor (not shown) connected to the external bus 70 and dedicated to a scheduling, for example, determines which one of both processors executes the translation process from the target program 41 to the translated program 21. The information processing apparatus 1 may be configured that at least one of the first processor 10a and the second processor 10b serves as the performance monitor.

Further, when the first processor 10a executes the binary translator 43 stored in the main memory 40 and based on the first instruction set of the first processor 10a, such first processor 10a can translates the binary translator 43 into the binary translator based on the second instruction set of the second processor 10b.

According to such procedure, even in the situation that both binary translators of the first processor 10a and the second processor 10b are not provided, either of the first processor 10a and the second processor 10b can execute the translation process from the target program 41 to the translated program 21.

It is to be understood that the invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An information processing system comprising:
a first processor that executes instructions belonging to a first instruction set;
a second processor that executes instructions belonging to a second instruction set;
a first memory that stores a translation target program that is designed based on the first instruction set, the first memory being unaccessible by the second processor;
a second memory that is accessible by the second processor; and
a data transfer unit that transfers data between the first memory and the second memory,
wherein the first processor operates to:
read the translation target program from the first memory;
determine whether each instruction included in the translation target program is a memory access instruction for accessing data stored in the first memory;
translate the instructions that are determined to be not the memory access instruction into translated instructions belonging to the second instruction set; and
translate the instructions that are determined to be the memory access instruction into an instruction sequence including a call instruction calling a data transfer library for controlling the data transfer unit to transfer the data between the first memory and the second memory, the data transfer library being stored in the second memory, and
wherein the second processor operates to:
execute the translated instructions that belong to the second instruction set; and
control the data transfer unit to transfer the data between the first memory and the second memory in accordance with the call instruction included in the instruction sequence.

2. An information processing system comprising:
a first processor that executes instructions belonging to a first instruction set;
a second processor that executes instructions belonging to a second instruction set;
a first memory that stores a translation target program that is designed based on the first instruction set, the first memory being unaccessible by the second processor;
a second memory that is accessible by the second processor; and
a data transfer unit that transfers data between the first memory and the second memory,
wherein the second processor operates to:
control the data transfer unit to transfer the translation target program from the first memory to the second memory;
read the translation target program from the second memory;
determine whether each instruction included in the translation target program is a memory access instruction for accessing data stored in the first memory;
translate the instructions that are determined to be not the memory access instruction into translated instructions belonging to the second instruction set;
translate the instructions that are determined to be the memory access instruction into an instruction sequence including a call instruction calling a data transfer library for controlling the data transfer unit to transfer the data between the first memory and the second memory, the data transfer library being stored in the second memory;
execute the translated instructions that belong to the second instruction set; and
control the data transfer unit to transfer the data between the first memory and the second memory in accordance with the call instruction included in the instruction sequence.

3. An information processing system comprising:
a first processor that executes instructions belonging to a first instruction set;
a second processor that executes instructions belonging to a second instruction set;
a first memory that stores a translation target program that is designed based on the first instruction set, the first memory being unaccessible by the second processor;
a second memory that is accessible by the second processor;
a data transfer unit that transfers data between the first memory and the second memory; and
a performance monitor that monitors processing loads of the first processor and the second processor and controls the first processor and the second processor to perform one of process [A] and [B] in accordance with the monitored processing loads,
wherein as the process [A],
the first processor operates to:
read the translation target program from the first memory;
determine whether each instruction included in the translation target program is a memory access instruction for accessing data stored in the first memory;
translate the instructions that are determined to be not the memory access instruction into translated instructions belonging to the second instruction set; and
translate the instructions that are determined to be the memory access instruction into an instruction sequence including a call instruction calling a data transfer library for controlling the data transfer unit to transfer the data between the first memory and the second memory, the data transfer library being stored in the second memory, and
the second processor operates to:
execute the translated instructions that belong to the second instruction set; and control the data transfer unit to transfer the data between the first memory and the second memory in accordance with the call instruction included in the instruction sequence, and wherein as the process [B],
the second processor operates to:
control the data transfer unit to transfer the translation target program from the first memory to the second memory;
read the translation target program from the second memory;
determine whether each instruction included in the translation target program is a memory access instruction for accessing data stored in the first memory;
translate the instructions that are determined to be not the memory access instruction into translated instructions belonging to the second instruction set;
translate the instructions that are determined to be the memory access instruction into an instruction sequence including a call instruction calling a data transfer library for controlling the data transfer unit to transfer the data between the first memory and the second memory, the data transfer library being stored in the second memory;
execute the translated instructions that belong to the second instruction set; and
control the data transfer unit to transfer the data between the first memory and the second memory in accordance with the call instruction included in the instruction sequence.

4. The system according to claim 3, wherein the translate target program is a program for the first processor to perform the process [A], and
wherein the translate target program is translated by the process [A] into a program executable by the second processor to perform the process [B].

5. A method for an information processing system including:
a first processor that executes instructions belonging to a first instruction set;
a second processor that executes instructions belonging to a second instruction set;
a first memory that is unaccessible by the second processor;
a second memory that is accessible by the second processor; and
a data transfer unit that transfers data between the first memory and the second memory,
wherein the method comprises:
controlling the first processor to:
read the translation target program from the first memory;
determine whether each instruction included in a translation target program is a memory access instruction for accessing data stored in the first memory, the translation target program being stored in the first memory and designed based on the first instruction set;
translate the instructions that are determined to be not the memory access instruction into translated instructions belonging to the second instruction set; and
translate the instructions that are determined to be the memory access instruction into an instruction sequence including a call instruction calling a data transfer library for controlling the data transfer unit to transfer the data between the first memory and the second memory, the data transfer library being stored in the second memory; and
controlling the second processor to:
execute the translated instructions that belong to the second instruction set; and
control the data transfer unit to transfer the data between the first memory and the second memory in accordance with the call instruction included in the instruction sequence.

6. A computer-readable recording medium that stores a program for causing an information processing system to operate in accordance with a procedure,
wherein the information processing system includes:
a first processor that executes instructions belonging to a first instruction set;
a second processor that executes instructions belonging to a second instruction set;
a first memory that is unaccessible by the second processor;
a second memory that is accessible by the second processor; and
a data transfer unit that transfers data between the first memory and the second memory,
wherein the procedure comprises:
controlling the first processor to:
read the translation target program from the first memory;
determine whether each instruction included in a translation target program is a memory access instruction for accessing data stored in the first memory, the translation target program being stored in the first memory and designed based on the first instruction set;
translate the instructions that are determined to be not the memory access instruction into translated instructions belonging to the second instruction set; and
translate the instructions that are determined to be the memory access instruction into an instruction sequence including a call instruction calling a data transfer library for controlling the data transfer unit to transfer the data between the first memory and the second memory, the data transfer library being stored in the second memory; and
controlling the second processor to:
execute the translated instructions that belong to the second instruction set; and
control the data transfer unit to transfer the data between the first memory and the second memory in accordance with the call instruction included in the instruction sequence.

* * * * *